US009229484B2

(12) United States Patent
Chen et al.

(10) Patent No.: US 9,229,484 B2
(45) Date of Patent: Jan. 5, 2016

(54) ELECTRONIC APPARATUS

(71) Applicant: COMPAL ELECTRONICS, INC., Taipei (TW)

(72) Inventors: Pai-Feng Chen, Taipei (TW); Chao-Cheng Shao, Taipei (TW); Ming-Fu Chen, Taipei (TW); Tsung-Lin Yang, Taipei (TW); Chien-Hua Cheng, Taipei (TW); Chung-Kuo Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 52 days.

(21) Appl. No.: 14/311,342

(22) Filed: Jun. 22, 2014

(65) Prior Publication Data

US 2015/0253812 A1    Sep. 10, 2015

(30) Foreign Application Priority Data

Mar. 7, 2014    (TW) .............................. 103203966 U

(51) Int. Cl.
*G06F 1/16*    (2006.01)
(52) U.S. Cl.
CPC ...................................... *G06F 1/166* (2013.01)
(58) Field of Classification Search
CPC ... G06F 1/1632; G06F 1/1654; G06F 1/1669; G06F 1/1679; G06F 2200/1639; G06F 1/1681
USPC ............. 361/679.17, 679.27, 679.29, 679.41, 361/679.43, 679.57, 679.58, 732; 292/95, 292/96, 121, 122, 128, 194, 195, 219, 220
See application file for complete search history.

(56) References Cited

U.S. PATENT DOCUMENTS

| 5,262,759 A * | 11/1993 | Moriconi | G06F 1/1616 361/679.29 |
| 2007/0297130 A1* | 12/2007 | Fan | G06F 1/1632 361/679.44 |
| 2013/0044425 A1* | 2/2013 | Lin | G06F 1/1669 361/679.43 |
| 2013/0155583 A1* | 6/2013 | Yang | G06F 1/1626 361/679.01 |
| 2013/0259564 A1* | 10/2013 | Lin | H01R 13/42 403/327 |
| 2014/0002974 A1* | 1/2014 | Kuo | G06F 1/1632 361/679.01 |
| 2014/0037372 A1* | 2/2014 | Chang | H05K 5/0221 403/327 |
| 2014/0133080 A1* | 5/2014 | Hwang | G06F 1/1632 361/679.17 |
| 2014/0313665 A1* | 10/2014 | Delpier | G06F 1/1616 361/679.55 |

* cited by examiner

*Primary Examiner* — Hoa C Nguyen
*Assistant Examiner* — Christopher L Augustin
(74) *Attorney, Agent, or Firm* — CKC & Partners Co., Ltd.

(57) ABSTRACT

An electronic apparatus includes a first assembly and a second assembly. The first assembly includes at least one hook and at least one elastic locating member. The second assembly includes at least one hook groove and at least one locating groove. The second assembly receives the hook of the first assembly by the hook groove along a first assembling direction. The second assembly makes the hook engaged to the hook groove along a second assembling direction. When the second assembly moves relative to the first assembly along the second assembling direction, the elastic locating member gets into the locating groove, thereby fastening the first assembly and the second assembly.

16 Claims, 7 Drawing Sheets

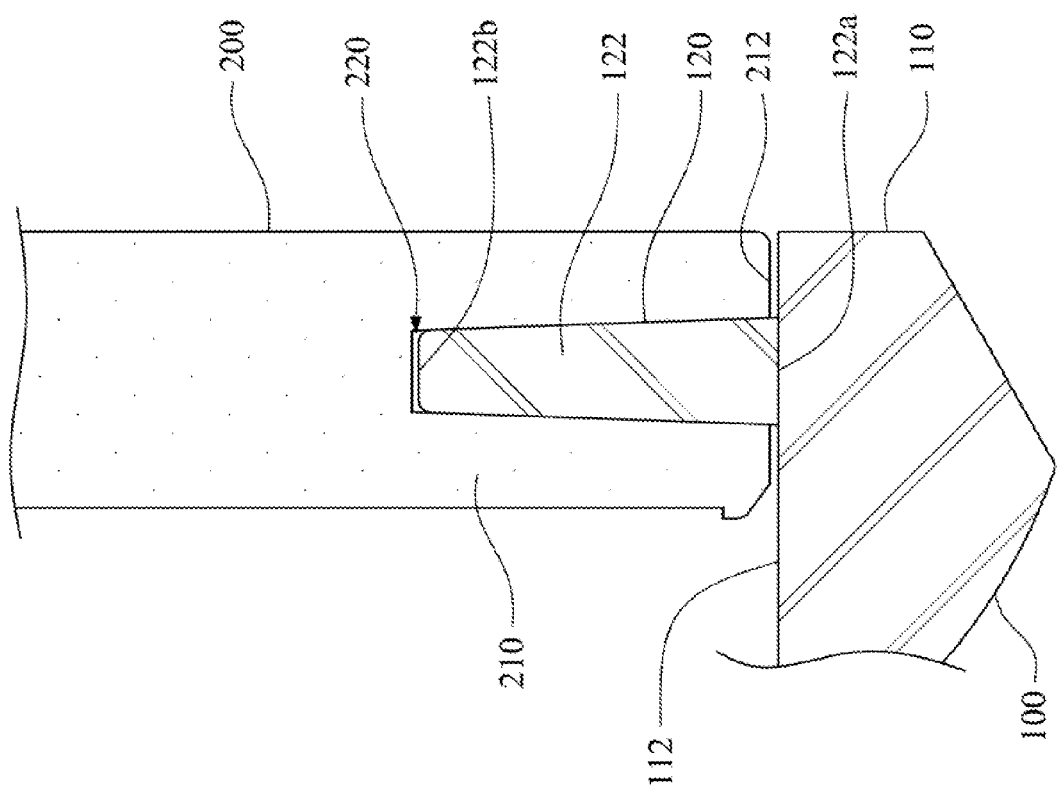

ELECTRONIC APPARATUS

RELATED APPLICATIONS

This application claims priority to Taiwan Application Serial Number 103203966, filed Mar. 7, 2014, which is herein incorporated by reference.

BACKGROUND

1. Technical Field

Embodiments of the present invention relate to an electrical apparatus. More particularly, embodiments of the present invention relate to a detachable electronic apparatus.

2. Description of Related Art

In pace with technology, a convertible notebook is developed which integrates the functions of notebook and tablet computers. In particular, the convertible notebook includes a tablet computer and a keyboard module. The tablet computer and the keyboard module can be combined and electrically connected as a notebook computer. Alternatively, the tablet computer can be separated from the keyboard module to be operated alone.

In a typical convertible notebook, the keyboard module has a hook and a linkage mechanism linked to the hook, and the tablet computer on the other hand has a hook groove. When the tablet computer is combined with the keyboard module, the hook is engaged to the hook groove. When an user attempts to separate the combined tablet computer and the keyboard module, he or she can push or pull the linkage mechanism on the keyboard module to move the hook away from the hook groove, thereby separating the tablet computer from the keyboard module.

However, in the foregoing convertible notebook, the user has to operate the linkage mechanism so as to move the hook away from the groove, which is inconvenient for the user.

SUMMARY

One aspect of the present invention is to provide an electronic device, in which two assemblies engaged to each other can be separated without operating any linkage mechanism.

In accordance with one embodiment of the present invention, an electronic apparatus includes a first assembly and a second assembly. The first assembly includes at least one hook and at least one elastic locating member. The second assembly includes at least one hook groove and at least one locating groove. The second assembly receives the hook of the first assembly by the hook groove along a first assembling direction. The second assembly makes the hook engaged to the hook groove along a second assembling direction. When the second assembly moves relative to the first assembly along the second assembling direction, the elastic locating member gets into the locating groove, thereby fastening the first assembly and the second assembly.

In the foregoing embodiment, when the user tries to separate the first assembly and the second assembly engaged to each other, as long as the user moves the second assembly along the direction opposite to the second assembling direction and then moves the second assembly along the direction opposite to the first assembling direction, the first assembly and the second assembly can be separated. As a result, the electronic apparatus allows separation for two assemblies engaged to each other without operating any linkage mechanism.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 7 is a fragmentary cross-sectional view of the first assembly and the second assembly in the combined state in accordance with one embodiment of the present invention.

DETAILED DESCRIPTION

Figure 1:
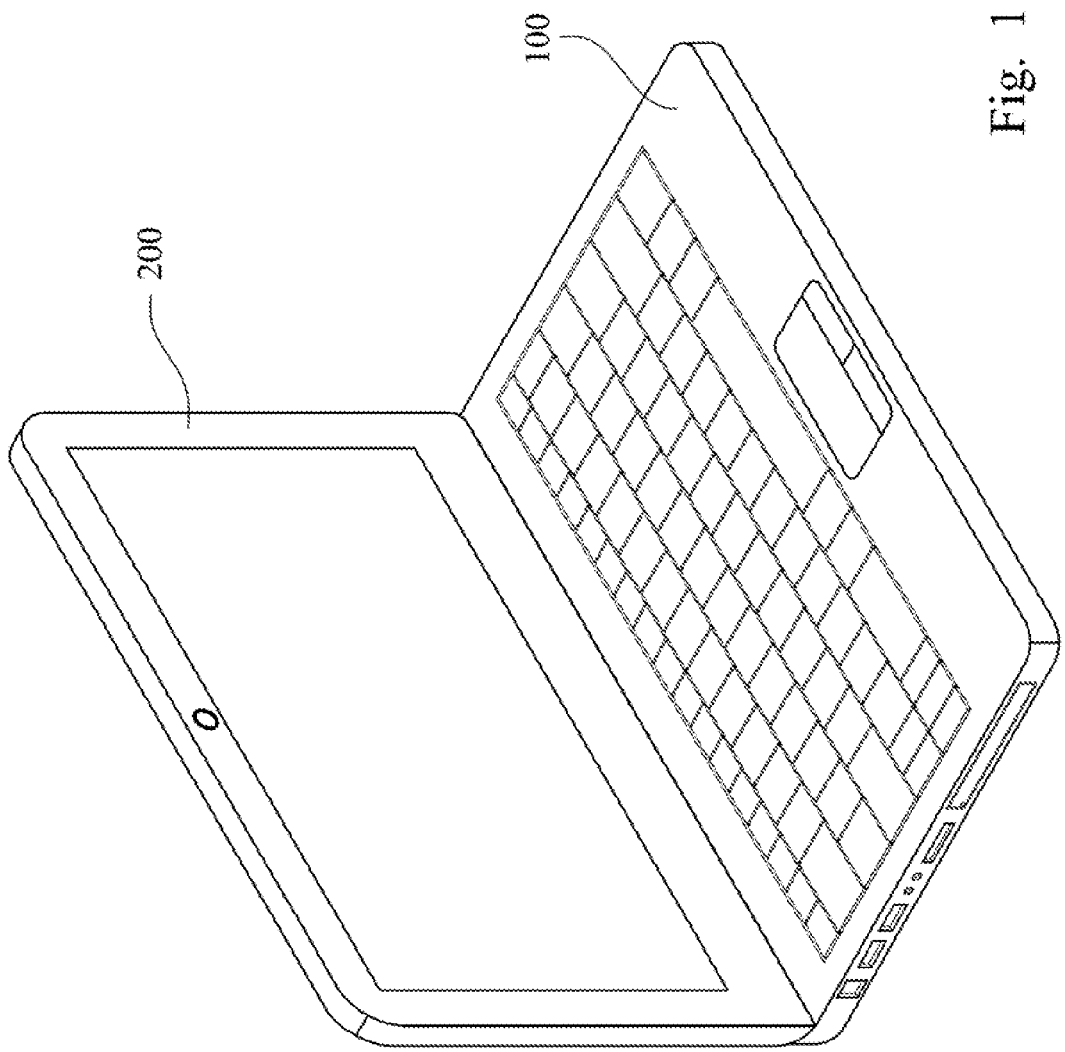
FIG. 1 is a perspective view of an electronic apparatus in a combined state in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
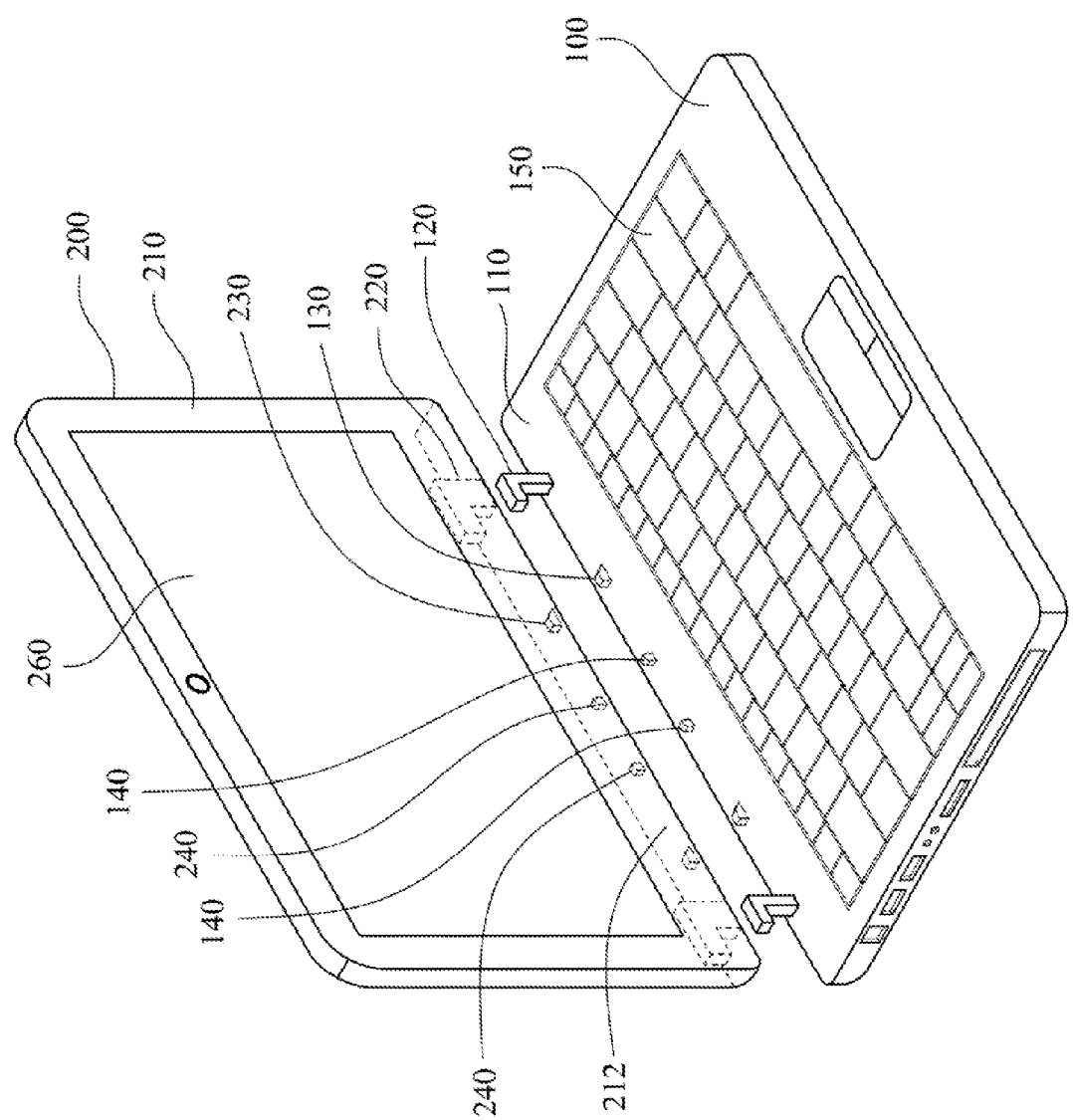
FIG. 2 is a perspective view of the electronic apparatus in a separated state.
Figure 3:
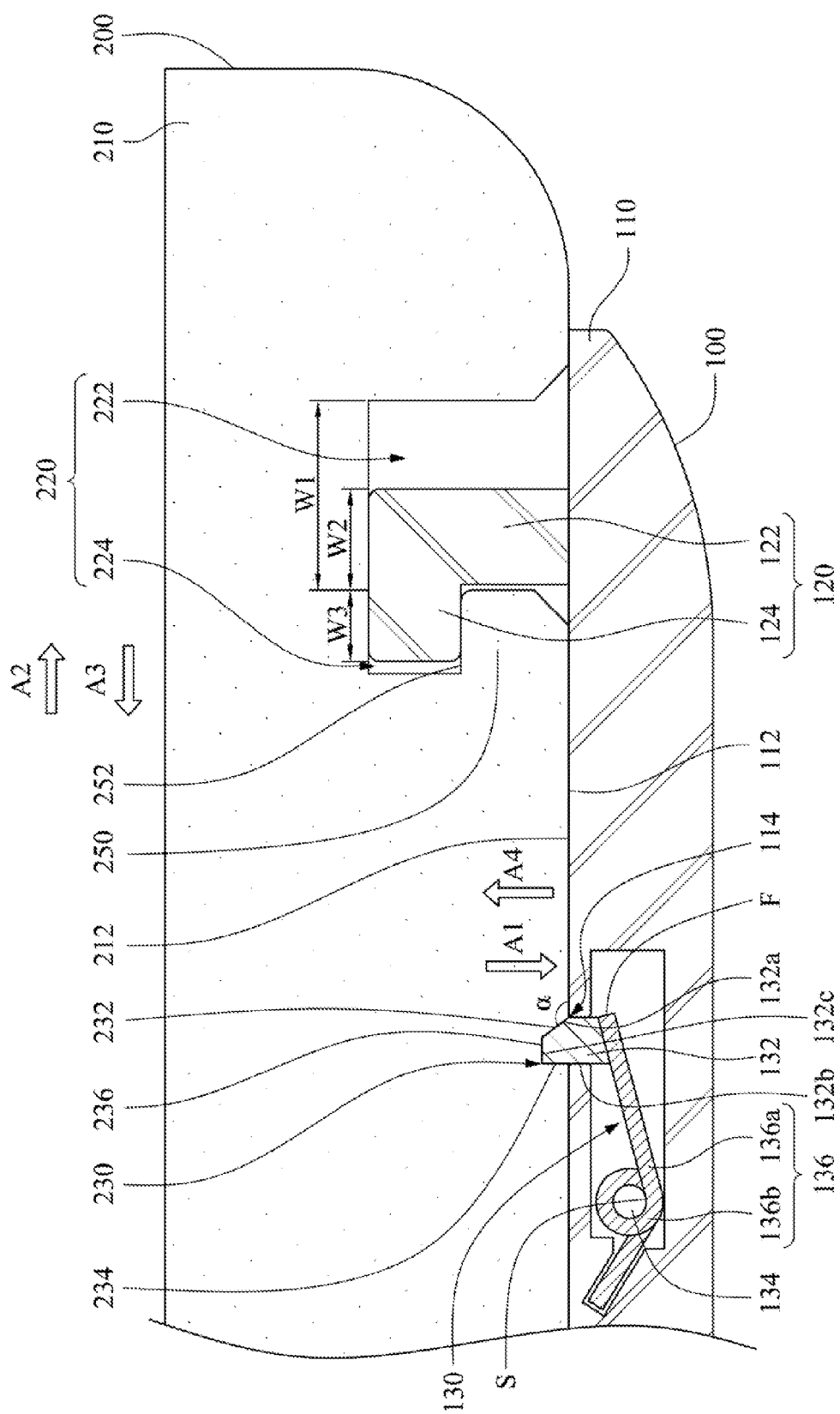
FIG. 3 is a cross-sectional view of the electronic apparatus in a combined state shown in FIG. 1.

FIG. 1 is a perspective view of an electronic apparatus in a combined state in accordance with one embodiment of the present invention. FIG. 2 is a perspective view of the electronic apparatus in a separated state. As shown in FIGS. 1 and 2, in this embodiment, an electronic apparatus includes a first assembly 100 and a second assembly 200. The first assembly 100 includes a base 110, at least one hook 120 and at least one elastic locating member 130. The hook 120 and the elastic locating member 130 are disposed on the base 110. The second assembly 200 includes at least one hook groove 220 and at least one locating groove 230. FIG. 3 is a cross-sectional view of the electronic apparatus in a combined state shown in FIG. 1. As shown in FIG. 3, the second assembly 200 receives the hook 120 of the first assembly 100 by the hook groove 220 along a first assembling direction A1. Then, the second assembly 200 makes the hook 120 engaged to the hook groove 220 along a second assembling direction A2. When the second assembly 200 moves relative to the first assembly 100 along the second assembling direction A2, the elastic locating member 130 gets into the locating groove 230, thereby combining and fastening the first assembly 100 and the second assembly 200.

The second assembly 200 includes a housing 210. The housing 210 has a bottom surface 212. The hook groove 220 and the locating groove 230 extend inwardly from the bottom surface 212. The hook 120 is engaged to the hook groove 220 in a pluggable manner. When the hook 120 is engaged to the hook groove 220, the first assembly 100 and the second assembly 200 are fastened. In other words, the hook 120 can be inserted into and engaged to the hook groove 220, and the hook 120 can be pulled out of the hook groove 220 as well. The elastic locating member 130 is elastically deformable, and it can be engaged to the locating groove 230. For example, the elastic locating member 130 can be forced or pressed by the bottom surface 212 of the housing 210, and then, it can slide on the bottom surface 212. When the elastic locating member 130 moves to the locating groove 230, it can rebound into the locating groove 230, so as to fasten the first assembly and the second assembly 200. In other words, the first assembly 100 and the second assembly 200 can be fastened by the engagement between the hook 120 and the hook groove 220, and by the engagement between the elastic locating member 130 and the locating groove 230.

As shown in FIG. 3, when the second assembly 200 is combined with the first assembly 100, the hook 120 can be engaged to the hook groove 220, and the elastic locating member 130 can be at least partially engaged to the locating groove 230. The locating groove 230 has an oblique groove wall 232. The oblique groove wall 232 is adjoined to the bottom surface 212 of the housing 210. An included angle α defined between the oblique groove wall 232 and bottom surface 212 is an obtuse angle, so that the oblique groove wall 232 is oblique downwardly. Because the oblique groove wall 232 is oblique downwardly, when a force along the direction A3 opposite to the second assembling direction A2 is exerted to the second assembly 200, the oblique groove wall 232 forces the elastic locating member 130 along the first assembling direction A1, so that the elastic locating member 130 can be moved out of the locating groove 230, which allows the second assembly 200 to move relative to the first assembly 100 along the direction A3, and facilitates the hook 120 to move out of the hook groove 220. As such, the first assembly 100 and the second assembly 200 can be separated from each other.

Therefore, the electronic apparatus according to the foregoing embodiments can separate the first assembly 100 and the second assembly 200 engaged to each other without any linkage mechanism. For example, as long as the user moves the second assembly 200 leftward, the elastic locating member 130 can move out of the locating groove 230. Then, as long as the user moves the second assembly 200 upward, the hook 120 can move out of the hook groove 220. In other words, when the second assembly 200 moves relative to the first assembly 100 along the direction A3 opposite to the second assembling direction A2, the elastic locating member 130 and the hook 120 can respectively move out of the locating groove 230 and the hook groove 220, so that the second assembly 200 can be separated from the first assembly 100 along the direction A4 opposite to the first assembling direction A1. In some embodiments, the first assembling direction A1 and the second assembling direction A2 are perpendicular to each other.

In some embodiments, the second assembly 200 includes a block 250. The block 250 is disposed in the hook groove 220. In particular, the block is protruded on the inner wall of the hook groove 220. The block 250 has an inner surface 252. The inner surface 252 is opposite to the bottom surface 212 of the housing 210. In other words, the inner surface 252 is not exposed outside of the housing 210. In some embodiments, the inner surface 252 can be substantially parallel to the bottom surface 212. When the hook 120 is engaged to the hook groove 220, the hook 120 contacts with the inner surface 252 of the block 250, so as to prevent the second assembly 200 from moving upward. When the second assembly 200 moves along the direction A3 to a particular position, the hook 120 can be not in contact with the inner surface 252 of the block 250, so as to allow the second assembly 200 to move upward (such as moving along the direction A4), thereby moving out of the hook groove 220. As a result, when the user tries to separate the first assembly 100 and the second assembly 200, the user can move the second assembly 200 leftward at first, so that the hook 120 can be not in contact with the inner surface 252 of the block 250, and then, the user can move the second assembly 200 upward, so as to separate the hook 120 and the hook groove 220 engaged to each other.

In some embodiments, as shown in FIG. 3, the hook 120 includes a pillar 122 and an engaging part 124. The pillar 122 is protruded on the base 110. The engaging part 124 is protruded on the pillar 122. The engaging part 124 is slidable on the inner surface 252 of the block 250. In particular, the base 110 has a top surface 112. The pillar 122 can extend from the top surface 112 of the base 110 along the direction A4, and the engaging part 124 can extend from the pillar 122 along the direction A3. The hook groove 220 includes a hook passage 222 and an engaging sub-groove 124. The hook passage 222 is spatially communicated with the engaging sub-groove 124. The hook passage 222 is exposed, and the engaging sub-groove 224 is shaded by the block 250 and not exposed outside the housing 210.

When the second assembly is fastened on the first assembly 100, the engaging part 124 can be engaged to the engaging sub-groove 224, and the pillar 122 can be positioned in the hook passage 222. In some embodiments, at least a portion of the engaging part 124 and the engaging sub-groove 224 are complementary in shape. For example, the engaging part 124 can be a cuboid, and the engaging sub-groove 224 can be a cuboid recess in the shape and size the same as the engaging part 124. As a result, the engaging part 124 can tightly contact with the inner wall of the engaging sub-groove 224, so as to fasten the first assembly 100 and the second assembly 200. It is understood that the cuboid shape is only explanatory, not used to limit the present invention. As long as at least a portion of the engaging part 124 and the engaging sub-groove 224 are complementary in shape, the engaging part 124 and the engaging sub-groove 224 can be in other shapes.

In some embodiments, the hook passage 222 has a width W1 along the second assembling direction A2, and the pillar 122 has a width W2 along the second assembling direction A2, and the engaging part 124 has a width W3 along the second assembling direction A2, in which $W1 \geq W2+W$. As a result, the hook passage 222 can accommodate the pillar 122 and the engaging part 124, so that when the engaging part 124 moves out of the engaging sub-groove 224, the engaging part 124 and the pillar 122 can both move in the hook passage 222.

In some embodiments, as shown in FIG. 3, the elastic locating member 130 includes a protrusion 132, a fixture 134 and a spring 136. The base 110 has a through hole 114. The through hole 114 is formed on the top surface 112 of the base 110. The protrusion 132 at least partially passes through the through hole 114 and is exposed out of the top surface 112. The fixture 134 is positioned in the base 110. The spring 136 is connected between the fixture 134 and the protrusion 132. As a result, when a force is exerted to the protrusion 132 along the first assembling direction A1, the protrusion 132 moves toward the base 110, and the spring 136 is compressed and thereby has elastic potential energy; when the force exerted to the protrusion 132 along the first assembling direction A1 stops, the spring 136 rebounds, which makes the protrusion 132 move out of the base 110. As such, in some embodiments, the protrusion 132 can be forced by the bottom surface 212 of the housing 210, which makes the spring 136 store elastic potential energy. When the protrusion 132 moves to the locating groove 230 along the bottom surface 212, the spring 136 rebounds, which makes the protrusion 132 rebound into the locating groove 230.

In some embodiments, at least a portion of the protrusion 132 and the locating groove 230 are complementary in shape. For example, the protrusion 132 can be a wedge, and the locating groove 230 can be a wedge-shaped recess in the shape and size the same as the protrusion 132. As a result, when the protrusion 132 rebounds into the locating groove 230, the protrusion 132 tightly contacts with the locating groove 230, so as to fasten the first assembly 100 and the second assembly 200. It is understood that the foregoing wedge shape is only explanatory, not used to limit the present invention. As long as at least a portion of the protrusion 132 and the locating groove 230 are complementary in shape, the protrusion 132 and the locating groove 230 can also be in other shapes.

In some embodiments, as shown in FIG. 3, the spring 136 has an elastic arm 136a and a winding part 136b. The winding part 136b is wound on the fixture 134. The elastic arm 136a is connected between the winding part 136b and the protrusion 132. The elastic arm 136a is oblique relative to the top surface 112 of the base 110. In other words, the lengthwise direction of the elastic arm 136a is not perpendicular to the top surface 112 of the base 110. As such, when a force is exerted to the protrusion 132 along the first assembling direction A1, the elastic arm 136a bends and stores elastic potential energy; when the force exerted to the protrusion 132 along the first assembling direction A1 stops, the elastic arm 136 rebounds, so that the protrusion 132 moves out of the base 110.

Figure 4:
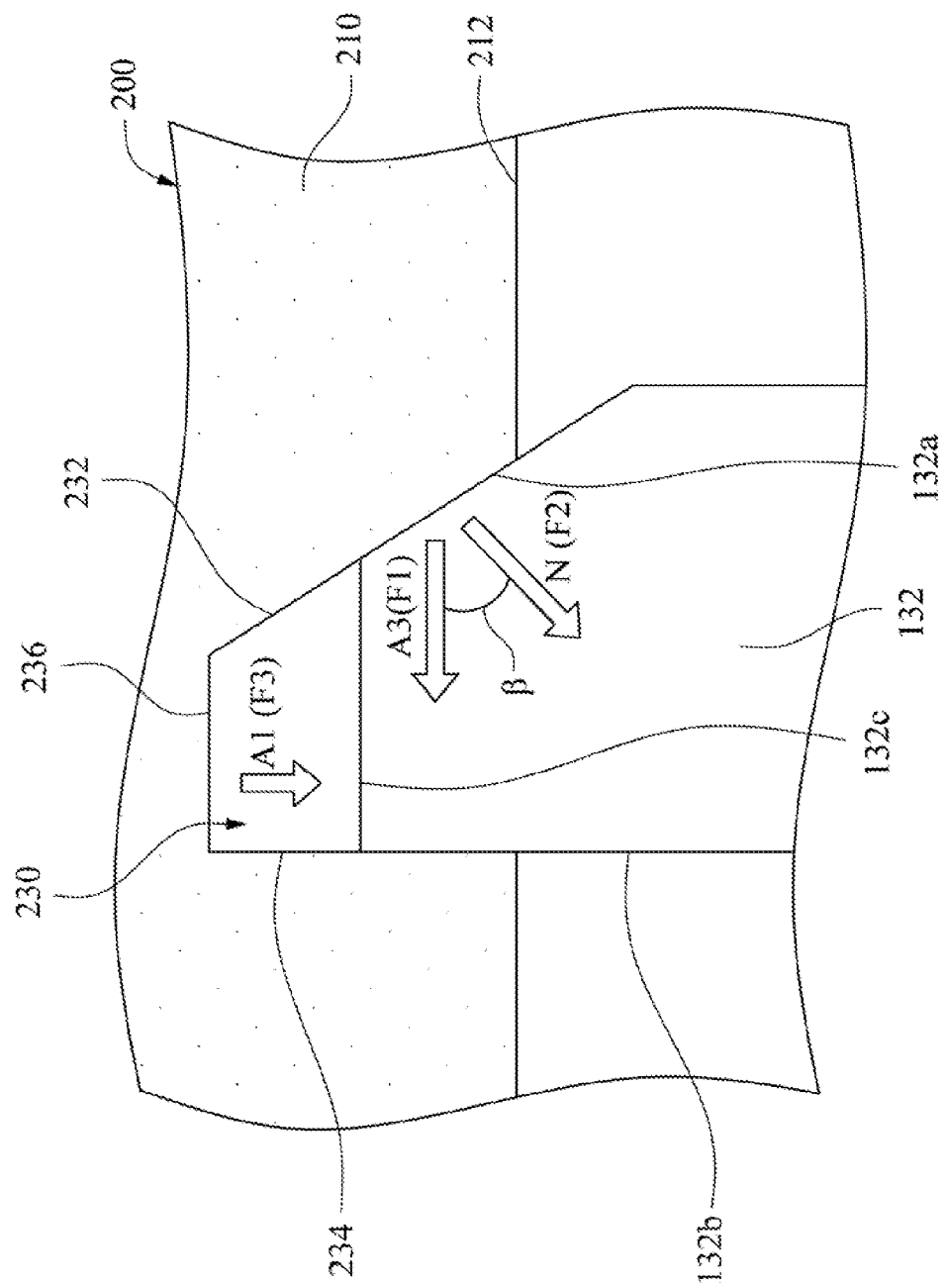
FIG. 4 is a fragmentary cross-sectional view of the protrusion and the locating groove in one transient state.

FIG. 4 is a fragmentary cross-sectional view of the protrusion 132 and the locating groove 230 in one transient state. In some embodiments, the protrusion 132 has an oblique surface 132a. The oblique surface 132a is slidable on the oblique groove wall 232 of the locating groove 230. For example, when the second assembly 200 moves along the direction A3, the oblique groove wall 232 exerts a force component to the protrusion 132 along the first assembling direction A1, which facilitates the protrusion 132 to move out of the locating groove 230 when the protrusion 132 moves along the first assembling direction A1.

In some embodiments, as shown in FIG. 3, the elastic arm 136a has a fixed end S and a free end F. The fixed end S is connected to the winding part 136b, and they are fixed on the fixture 134. The free end S is connected to the protrusion 132. The fixed end S is further away from the top surface 112 of the base 110 than the free end F is. In other words, the vertical distance from the elastic arm 136a to the top surface 112 reduces along the direction from the fixed end S toward the free end F, so that the free end F, which the protrusion 132 is disposed on, can be higher than the fixed end S in altitude. The foregoing configuration facilitates the elastic arm 136 to bend downward and to store elastic potential energy, which facilitates the elastic arm 136a to rebound upward and to move out of the base 110.

In particular, the second assembly 200 can move along the direction A3, so that the oblique surface 132a can slide on the oblique groove wall 232 and can gradually depart from the oblique groove wall 232. As such, the protrusion 132 can be forced to move out of the locating groove 230. More particularly, the included angle β defined between the normal line direction N of the oblique groove wall 232 and the direction A3 is an acute angle, and therefore, when the force F1 is exerted to the second assembly 200 along the direction A3, the force F1 can be resolved into at least one force component F2 along the normal line direction N because the included angle β is an acute angle. The force component F2 along the normal line direction N can be exerted to the oblique surface 132a of the protrusion 132 via the oblique groove wall 232. Because the force component F2 along the normal line direction N can be resolved into at least the downward force component F3 (namely, the force component F3 along the first assembling direction A1), it can make the protrusion 132 move downward relative to the locating groove 230 and can make the protrusion 132 move out of the locating groove 230.

In some embodiments, the oblique surface 132a of the protrusion 132 is substantially parallel to the oblique groove wall 232, so as to facilitate the oblique surface 132a to slide on the oblique groove wall 232. It is understood that the term "substantially" in this context refers that any minor variation or modification not affecting the essence of the technical feature can be included in the scope of the present invention. For example, the oblique surface 132a is substantially parallel to the oblique groove wall 232" not only includes embodiments where the oblique surface 132a is exactly parallel to the oblique groove wall 232, but also includes embodiments where the oblique surface 132a is slightly nonparallel to the oblique groove wall 232.

In some embodiments, as shown in FIG. 4, the locating groove 230 has a vertical groove wall 234. The vertical groove wall 234 is opposite to the oblique groove wall 232. The vertical groove wall 234 is substantially perpendicular to the bottom surface 212 of the housing 210 and adjoined to the bottom surface 212. The vertical groove wall 234 can prevent the protrusion 132 in the locating groove 230 from moving leftward, thereby securing the protrusion 132.

In some embodiments, the locating groove 230 further includes a connecting groove all 236. The connecting groove wall 236 is adjoined between the oblique groove wall 232 and the vertical groove wall 234. In other words, the oblique groove wall 232 is adjoined to one edge of the connecting groove wall 236, and the vertical groove wall 234 is adjoined to another edge of the connecting groove wall 236. In some embodiments, the connecting groove wall 236 can be substantially parallel to the bottom surface 212 of the housing 210. In some embodiments, the oblique groove wall 232, the connecting groove wall 236 and the vertical groove wall 234 can be adjoined sequentially, so as to form a wedge-shaped recess.

In some embodiments, the protrusion 132 further includes a vertical surface 132b and a connecting surface 132c. The vertical surface 132b is opposite to the oblique surface 132a. The connecting surface 132c is adjoined between the oblique surface 132a and the vertical surface 132b. In other words, the oblique surface 132a is adjoined to one edge of the connecting surface 132c, and the vertical surface 132b is adjoined to another edge of the connecting surface 132c. The connecting surface 132c is substantially parallel to the connecting groove wall 236, and the vertical surface 132b is substantially parallel to the vertical groove wall 234, so that the protrusion 132 and the locating groove 230 can be complementary in shape. In some embodiments, the oblique surface 132a, the connecting surface 132c and the vertical surface 132b can be adjoined sequentially, so as to form a wedge. In some embodiments, as shown in FIG. 3, the oblique surface 132a can be oblique relative to the top surface 112 of the base 110, and the included angle therebetween is the angle α. The connecting surface 132c can be substantially parallel to the top surface 112. The vertical surface 132b can be substantially perpendicular to the top surface 112.

Figure 5:
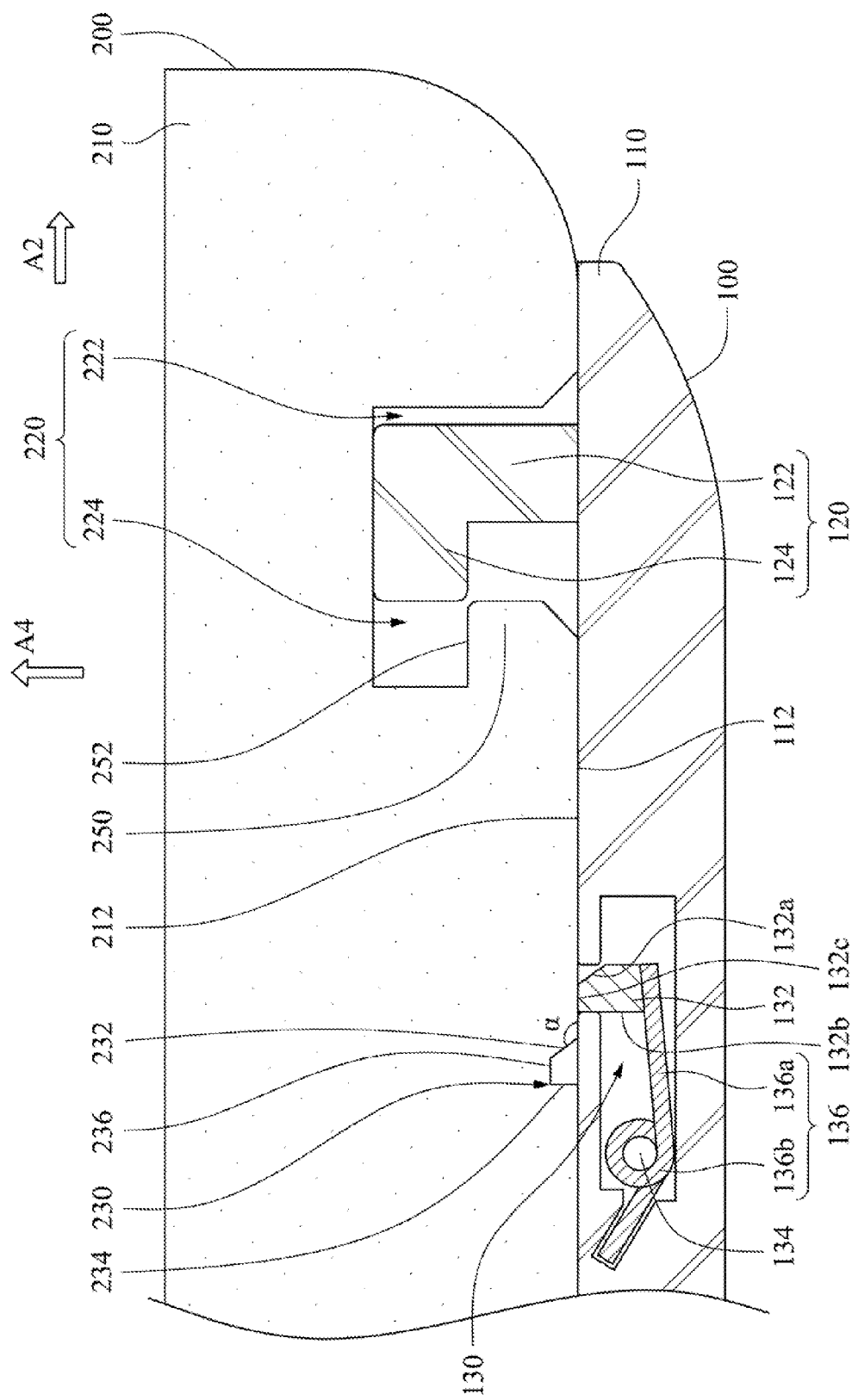
FIGS. 5 and 6 are cross-sectional views of the first assembly and the second assembly in different transient states during operation.
Figure 6:
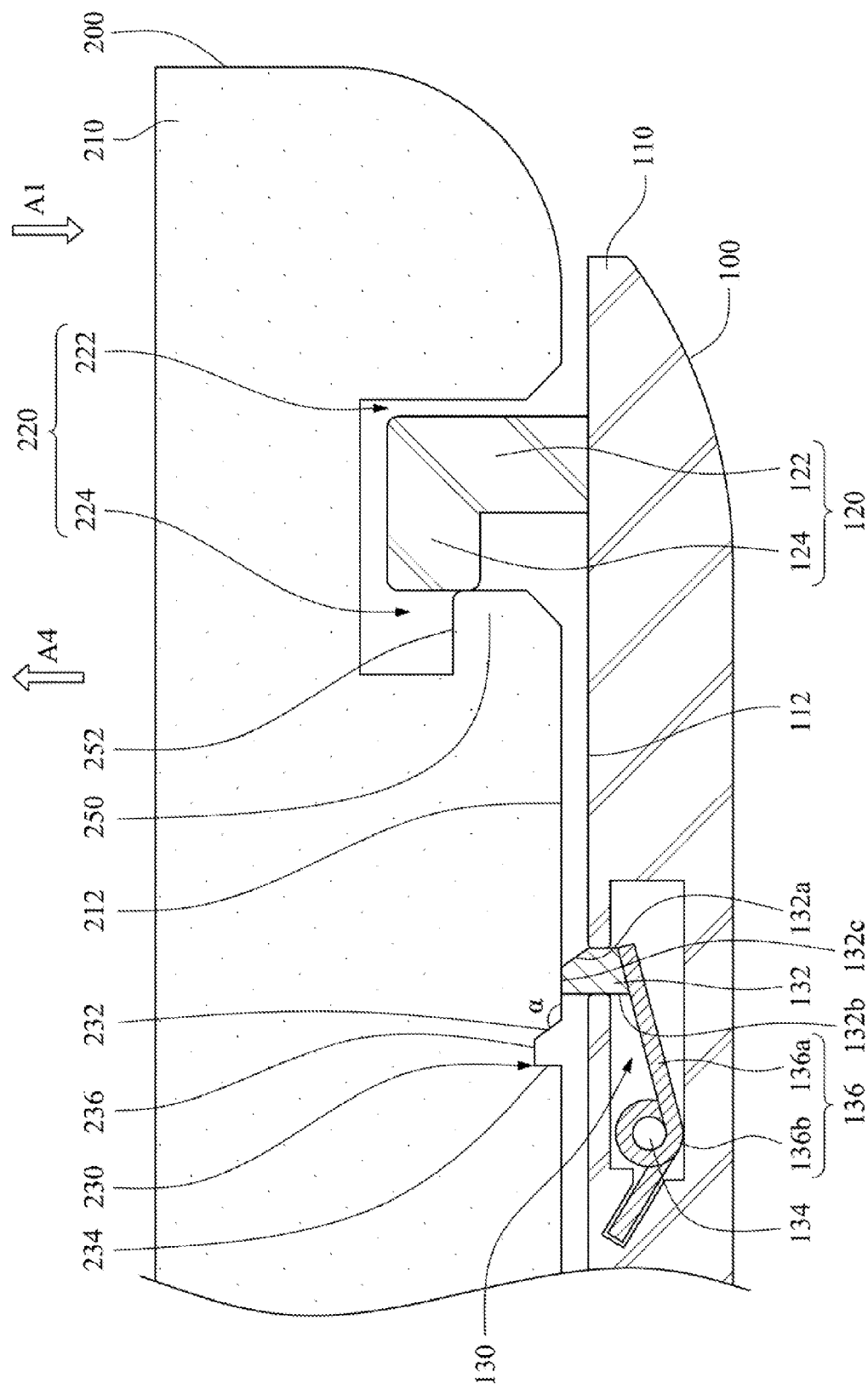

FIGS. 5 and 6 are cross-sectional views of the first assembly 100 and the second assembly 200 in different transient states during operation. The steps for separating the second assembly from the first assembly 100 are described as follow. Referring to FIG. 3 at first, the second assembly 200 can move leftward (such as moving along the direction A3) to form the state shown in FIG. 5. At this time, the protrusion 132 moves out of the locating groove 230 and slides on the bottom surface 212 of the housing 210. Then, as shown in FIG. 5, when the engaging part 124 departs from the inner surface 252 of the block 250, (in other words, when the engaging part 124 moves out of the engaging sub-groove 224) the second assembly 200 moves upward (such as moving along the direction A4) to form the state as shown in FIG. 6. Then, as shown in FIG. 6, the second assembly 200 can keep moving upward (such as moving along the direction A4), so that the hook 120 can move out of the hook passage 222. As a result, the first assembly 100 and the second assembly 200 can be separated from each other.

The steps for fastening the second assembly 200 on the first assembly 100 are described as follow. As shown in FIG. 6, the hook groove 220 of the second assembly 200 can be aligned with the hook 120 of the first assembly 100. Then, the second assembly 200 can move downward (such as moving along the first assembling direction A1) to receive the hook 120 by the hook passage 222, thereby forming the state as shown in FIG. 5. At this time, the protrusion 132 is forced by the bottom surface 212 of the housing 210 to move into the base 110, and the elastic arm 136a bends and stores elastic potential energy. Then, as shown in FIG. 5, the second assembly 200 moves rightward (such as moving along the second assembling direction A2) to make the engaging part 124 move into the engaging sub-groove 224, thereby forming the state as shown in FIG. 3. At this time, the protrusion 132 rebounds by the elastic arm 136a into the locating groove 230, thereby engaging to the locating groove 230. As a result, the second assembly 200 can be fastened on the first assembly 100.

FIG. 7 is a fragmentary cross-sectional view of the first assembly 100 and the second assembly 200 in the combined state in accordance with one embodiment of the present invention. As shown in FIG. 7, in some embodiments, the pillar 122 of the hook 120 tapers along a direction away from the base 110. In other words, the cross section of the pillar 122 can be a trapezoid having a narrower top edge and a broader bottom edge. This configuration improves the structural strength and facilitates to support the second assembly 200. Further, in some embodiments, the hook groove 220 can be a trapezoidal recess having a narrower top edge and a broader bottom edge, so as to fasten the trapezoidal pillar 122.

In particular, in some embodiments, the pillar 122 includes a bottom surface 122a and a top surface 122b. The bottom surface 122a is connected to the top surface 112 of the base 110. The top surface 122b is opposite to the bottom surface 122a. The area of the top surface 122b is less than the area of the bottom surface 122a, which allows the pillar 122 to taper along the direction away from the base 110, thereby improving the structural strength of the pillar 122.

Referring back to FIG. 2, in some embodiments, the first assembly 100 includes at least one first electrical connection member 140. The second assembly includes at least one second electrical connection member 240. The first electrical connection member 140 and the second electrical connection member 240 are electrically connected in a pluggable manner. For example, when the second assembly 200 is fastened on the first assembly 100, the first electrical connection member 140 can insert into the second electrical connection member 240, so as to electrically connect the first assembly 100 and the second assembly 200. In some embodiments, the first electrical connection member 140 can be a pogo pin, and the second electrical connection member 240 can be an electrical socket corresponding to the pogo pin.

In some embodiments, as shown in FIG. 2, the first assembly 100 includes a keyboard module 150. The second assembly 200 includes a touch display panel 260. The keyboard module 150 and the touch display panel 260 are electrically connected via the first electrical connection member 140 and the second electrical connection member 240. As a result, the user can operate the touch display panel 260 by the keyboard module 150. For example, the keyboard module 150 can be electrically connected to the first electrical connection member 140, and the touch display panel 260 can be electrically connected to the second electrical connection member 240. When the first electrical connection member 140 inserts into the second electrical connection member 240, the keyboard module 150 can be electrically connected to the touch display panel 260. In some embodiments, when the second assembly 200 is separated from the first assembly 100, the second assembly 200 can be operated individually as a tablet computer.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic apparatus, comprising:
   a first assembly comprising at least one hook and at least one elastic locating member; and
   a second assembly comprising at least one hook groove and at least one locating groove,
   wherein the second assembly receives the hook of the first assembly by the hook groove along a first assembling direction, and the second assembly makes the hook engaged to the hook groove along a second assembling direction, wherein when the second assembly moves relative to the first assembly along the second assembling direction, the elastic locating member gets into the locating groove, thereby fastening the first assembly and the second assembly.

2. The electronic apparatus of claim 1, wherein when the second assembly moves relative to the first assembly along a direction opposite to the second assembly direction, the elastic locating member and the hook respectively move out of the locating groove and the hook groove, such that the second assembly moves along a direction opposite to the first assembling direction to separate from the first assembly.

3. The electronic apparatus of claim 1, wherein the first assembling direction and the second assembling direction are perpendicular to each other.

4. The electronic apparatus of claim 1, wherein the second assembly comprises a housing having a bottom surface and at least one block, wherein the hook groove and the locating groove extend inwardly from the bottom surface, and the locating groove has an oblique groove wall, wherein an included angle defined between the oblique groove wall and bottom surface is an obtuse angle, wherein the block is disposed in the hook groove, and the block has an inner surface opposite to the bottom surface; when the hook is engaged to the hook groove, the hook contacts with the inner surface of the block; the elastic locating member is used to rebound into the locating groove, and the oblique groove wall of the locating groove is used to force the elastic locating member to move out of the locating groove.

5. The electronic apparatus of claim 4, wherein the locating groove has a vertical groove wall opposite to the oblique groove wall, and the vertical groove wall is substantially perpendicular to the bottom surface.

6. The electronic apparatus of claim 4, wherein the elastic locating member comprises:
- a protrusion, wherein the first assembly comprises a base having a top surface and a through hole formed on the top surface, wherein the protrusion at least partially passes through the through hole and is exposed out of the top surface;
- a fixture positioned in the base; and
- a spring connected between the fixture and the protrusion.

7. The electronic apparatus of claim 6, wherein the spring has an elastic arm and a winding part, wherein the winding part is wound on the fixture, and the elastic arm is connected between the winding part and the protrusion, wherein the elastic arm is oblique relative to the top surface of the base.

8. The electronic apparatus of claim 7, wherein the elastic arm has a fixed end and a free end, wherein the fixed end is connected to the winding part and the free end is connected to the protrusion, and the fixed end is further away from the top surface of the base than the free end is.

9. The electronic apparatus of claim 6, wherein the protrusion has an oblique surface, and the oblique surface is slidable on the oblique groove wall of the locating groove, and the oblique surface is substantially parallel to the oblique groove wall.

10. The electronic apparatus of claim 9, wherein the protrusion has a vertical surface opposite to the oblique surface, and the vertical surface is substantially perpendicular to the top surface of the base.

11. The electronic device of claim 6, wherein the locating groove and at least a portion of the protrusion are complementary in shape.

12. The electronic apparatus of claim 4, wherein the first assembly comprises a base, and the hook comprises a pillar and an engaging part, wherein the pillar is protruded on the base, and the engaging part is protruded on the pillar, and the engaging part is slidable on the inner surface of the block.

13. The electronic apparatus of claim 12, wherein the hook groove comprises an engaging sub-groove shaded by the block, wherein at least a portion of the engaging part and the engaging sub-groove are complementary in shape.

14. The electronic apparatus of claim 12, wherein the pillar tapers along a direction away from the base.

15. The electronic apparatus of claim 1, wherein the first assembly further comprises at least one first electrical connection member, and the second assembly further comprises at least one second electrical connection member, wherein the first electrical connection member and the second electrical connection member are electrically connected in a pluggable manner.

16. The electronic apparatus of claim 15, wherein the first assembly further comprises a keyboard module, and the second assembly further comprises a touch display panel, wherein the keyboard module and the touch display panel are electrically connected via the first electrical connection member and the second electrical connection member.

* * * * *